US 8,650,780 B2

(12) United States Patent
Spencer et al.

(10) Patent No.: US 8,650,780 B2
(45) Date of Patent: Feb. 18, 2014

(54) LICENSE PLATE FRAME PIVOTING FASTENER COVER

(75) Inventors: Todd Spencer, Colorado Springs, CO (US); Bret Zelenka, Colorado Springs, CO (US); Eldon Goates, Colorado Springs, CO (US)

(73) Assignee: Cruiser Accessories, LLC, Monument, CO (US)

( * ) Notice: Subject to any disclaimer, the term of this patent is extended or adjusted under 35 U.S.C. 154(b) by 8 days.

(21) Appl. No.: 13/374,266

(22) Filed: Dec. 19, 2011

(65) Prior Publication Data

US 2013/0152435 A1 Jun. 20, 2013

(51) Int. Cl.
*A47G 3/00* (2006.01)
*G09F 7/00* (2006.01)

(52) U.S. Cl.
USPC .............. 40/209; 40/210; 40/798; 411/372; 411/373

(58) Field of Classification Search
USPC ......... 40/200, 201, 209; 411/372.6, 349, 373, 411/374, 429; 70/232
See application file for complete search history.

(56) References Cited

U.S. PATENT DOCUMENTS

| | | | | | |
|---|---|---|---|---|---|
| 98,733 | A | * | 1/1870 | Barker | 411/373 |
| 918,733 | A | * | 4/1909 | Barker | 293/36 |
| 2,095,507 | A | | 10/1937 | Meadows | |
| 2,201,519 | A | * | 5/1940 | Buehner | 40/202 |
| 2,201,930 | A | | 5/1940 | Stark | |
| 2,275,073 | A | | 3/1942 | Buehner | |
| 2,355,300 | A | * | 8/1944 | Johnstone | 70/455 |
| 5,027,537 | A | | 7/1991 | Freeman | |
| D348,425 | S | | 7/1994 | Leu | |
| 5,718,137 | A | * | 2/1998 | Huston | 70/423 |
| 5,979,339 | A | * | 11/1999 | Smith | 109/50 |
| D492,633 | S | | 7/2004 | Wales | |
| D531,558 | S | | 11/2006 | Peng | |
| D609,082 | S | * | 2/2010 | Camisasca et al. | D8/382 |
| 2005/0045021 | A1 | | 3/2005 | Berger | |
| 2006/0075665 | A1 | * | 4/2006 | Lee et al. | 40/202 |
| 2007/0289176 | A1 | * | 12/2007 | Anderson | 40/209 |

* cited by examiner

*Primary Examiner* — Casandra Davis
(74) *Attorney, Agent, or Firm* — Linda Flewellen Gould

(57) ABSTRACT

A specialized fastener cover is suitable for concealing a fastener used to attach one object to another. The fastener cover includes a decorative emblem and a method of pivoting the emblem between two positions. In one position, the decorative emblem conceals the fastener. When the emblem is pivoted to the second position, the fastener can be accessed so that it can be inserted in fastener receptacles in the objects to attach the objects to one another or removed from the fastener receptacles to separate the two objects. The fastener cover can be incorporated into an attachable object, such as a license plate frame to be attached to a vehicle.

14 Claims, 6 Drawing Sheets

LICENSE PLATE FRAME PIVOTING FASTENER COVER

BACKGROUND OF THE INVENTION

1. Field of the Invention

The present invention relates to a pivoting fastener cover suitable for incorporation into a license plate frame which cover allows a decorative emblem to be moved between two positions, one of which positions conceals a fastener and the other of which positions allows access to the fastener.

2. Description of the Prior Art

Several different types of fasteners, including nails, screws, and brads, may be used to attach one object to another. Typically such fasteners are not aesthetically pleasing, so covers may be used to conceal the head of a fastener once it is in place. A variety of different fastener covers are well known, including screw covers for screws holding together components of electrical devices, wood plugs for concealing fasteners holding together components of wood furniture, metal plates used to cover multiple screws holding together components of equipment as diverse as computers and lawnmowers, and covers for fasteners holding together automobile components.

Fastener covers may provide an artistic element for the object to which they are attached. In some applications, limited space for aesthetic elements may be effectively expanded by using the fastener cover itself as an area of artistic expression. Using a fastener cover as additional area in which to display aesthetic elements is particularly useful in the context of license plate frames surrounding a vehicle license plate because such frames are limited in size and shape by several considerations. License plate frames cannot extend outward from the license plate into space occupied by the bumper or other components of the vehicle and cannot extend inward in a manner which would obscure visibility of numbers, letters, or renewal tags legally required to be displayed on the license plate. To provide maximum artistic expression for such license plate frames, it is desirable to utilize all of the frame area, including the areas in which a fastener is inserted to hold the frame in place on the vehicle.

However, placing a cover over a fastener has the detrimental effect of making it difficult to access the fastener, limiting opportunities to remove or loosen the fastener to take the objects apart or create some space between the objects. It is useful to allow the fastener cover to be moved out of the way to access the fastener itself, while providing a temporary position for the fastener cover while it is still attached to the object, so that the fastener cover is not easily lost.

Although decorative fastener covers are well known, a cover particularly useful for license plate frames should be aesthetically pleasing, provide additional space for artistic elements, remain attached to the frame while permitting easy access to the fastener, and detent back to a most aesthetically pleasing orientation.

SUMMARY AND OBJECTS OF THE INVENTION

A primary object of the present invention is to provide a pivoting fastener cover which can be easily moved between two positions, one of which positions allows a fastener to be accessed for insertion or removal and the second of which positions allows the cover to conceal the unattractive fastener.

Another object of the present invention is to provide a license plate frame which incorporates such a pivoting fastener cover, so that the pivoting fastener cover can be easily moved between two positions when the license plate frame is attached to a vehicle by the fastener to be concealed.

Yet another object of the present invention is to provide a fastener cover which is not easily detachable, permitting a fastener to be inserted or removed but restricting removability of the fastener cover itself, to minimize the possibility of theft or accidental loss. The present invention achieves this goal without connecting the fastener cover to the fastener itself, allowing the fastener cover to be held in place even when a fastener is not placed beneath the cover.

Yet another object of the present invention is to provide such a fastener cover which adds aesthetic appeal and maximizes the area in which artistic elements can be displayed. Ideally, the fastener cover of the claimed invention automatically adjusts to a position which is most perfectly suited to the overall visual impact of the object held in place by the fastener.

Yet another object of the present invention is to accomplish the above objects without the use of tools or a special apparatus to properly align the cover.

These objects are achieved by a specialized pivoting fastener cover. The pivoting fastener cover is designed to be incorporated into an object which is to be attached to a second object. For example, the pivoting fastener cover could be incorporated into a sign to be attached to a wall, a face plate to be attached to a cell phone, or a license plate frame to be attached to a vehicle. In any context in which it is desirable to create a decorative or aesthetically pleasing result, it may be advantageous to provide a method of covering one or more fasteners used to connect multiple objects, while allowing each fastener cover to be pivoted or otherwise moved away to access the fastener.

The pivoting fastener cover of the present invention is particularly useful when incorporated into a vehicle license plate frame. Because of legal and physical restrictions, license plate frames have a limited area in which to express an artistic design or message. The overall design of the frame must fit within physical attributes of the vehicle, avoiding features such as tail lights and bumpers, while providing an unrestricted view of legally required indicia on the license plate surrounded by the frame. The screws or other fasteners utilized to attach the license plate frame to the vehicle typically detract from the overall artistic presentation of the frame, and limit the area in which that design can be displayed. Typical snap-on fastener covers are available, but such covers are easily lost when the cover is purposely removed to access the fastener for tightening or removal or when motion of the vehicle jostles the frame. Such fastener covers are also easily damaged by tools used to remove the covers to expose the fastener. Furthermore, typical snap on fastener covers have no mechanism to cause the cover to be oriented in a particular position, making it difficult to place the cover in a position which provides continuity to a design which is displayed across the frame and the fastener cover.

The pivoting fastener cover of the present invention includes an emblem and a pivoting mechanism. The emblem is typically chosen for aesthetic reasons, adding to the decorative effect of the license plate frame or other object incorporating the fastener cover. For example, an emblem may portray a logo for a team or company, a geographic location, or simply an artistic design. The emblem has an obverse and reverse, the obverse face or side being observable and the reverse face or side being largely hidden to an observer of the object. The emblem typically includes some method of attaching it to the license plate frame from the reverse side such as one or more screw receptacles, suitable for receiving the point of a screw, a hole for inserting a blind rivet, or any number of other attachment mechanisms.

Thus, a screw inserted through a channel or hole formed in or connected to the license plate frame and into a screw receptacle in the reverse of the emblem holds the emblem in place with the reverse side adjacent to the frame. The channel of the license plate frame is positioned in proximity to a fastener receptacle formed in the license plate frame suitable for receiving a fastener to attach the license plate frame to a vehicle, so that the emblem held in place by a screw inserted through the channel may be positioned to conceal a fastener which has been inserted through that fastener receptacle.

The emblem may be pivoted, translated, slid, or otherwise moved between two positions by a pivoting mechanism. In one position, the fastener location is exposed so the fastener can be inserted or removed from the fastener receptacle of the license plate frame or other object, allowing a fastener to be inserted to hold the license plate frame to a vehicle, or removed to allow the frame to be separated from the vehicle. Once the fastener has been inserted to hold the frame to the vehicle, the pivoting mechanism enables the emblem to be moved to a second position in which the emblem conceals the fastener, adding to the over-all decorative effect of the frame. In both positions, the emblem is connected to the frame, eliminating the possibility of the emblem being lost during the process of accessing the fastener or by jostling as the vehicle moves.

On some vehicles, the license plate and therefore the license plate frame are held by only two screws rather than four. Since most license plate frames have four screw receptacles to accommodate the largest number of possible vehicles, it may also be desirable to cover the two unused receptacles instead of leaving them exposed and unsightly. The pivoting cover of the present invention covers the receptacles in which screws are inserted as well as the empty holes, since the presence of a screw in the hole is not necessary for attachment of the fastener cover. Therefore, the same artistic presentation is achieved regardless of which receptacles are used for the fasteners.

Throughout this specification, the term "pivoting" is used to refer to any motion, including pivoting, sliding, and translating, which moves the emblem between one of two distinct positions. In a preferred embodiment, the pivoting mechanism includes a raised protrusion on the reverse of the emblem adjacent to the screw receptacle of the emblem, a compressible spring to surround the screw, and one or more indentations formed in the face of the screw-receiving channel of the license plate frame. Advantageously, an indentation formed in the face of the channel is positioned to receive the raised protrusion of the emblem when the emblem has been pivoted into the position that conceals a fastener, holding the emblem in that position as a detent. However, when force is applied to the emblem in a direction perpendicular to the channel, the emblem is pivoted toward the position suitable for accessing the fastener. As the emblem is pivoted, the spring compresses to allow the protrusion to slide out of the indentation in the channel face, allowing the emblem to be moved away from the fastener receptacle so that a fastener can be inserted, tightened, loosened, or removed. A second indentation, detent, or detent position, may be created in the face of the channel to receive the protrusion when the emblem is pivoted away from the fastener receptacle, to temporarily secure the emblem in that position while working with the fastener.

A license plate frame incorporating the pivoting fastener cover of the present invention may be attached to or removed from a vehicle easily, without the emblem hindering access to the fastener connecting the frame to the vehicle. At the same time, the emblem can add decoration and artistic expression to the frame, and provides further aesthetic appeal by concealing an otherwise detractive fastener or empty screw receptacle.

Figure 1:
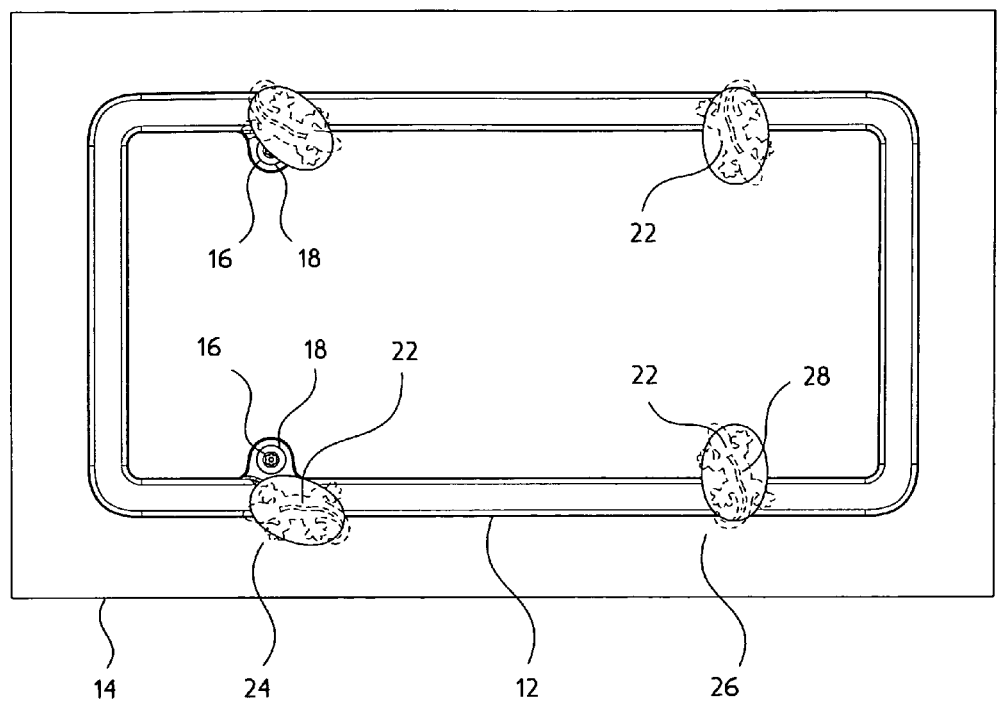
FIG. 1 is a front view of a license plate frame with multiple pivoting fastener covers according to the present invention, some of which covers are covering fasteners and some of which are pivoted away from or partially away from fasteners, which fasteners are used to attach the frame to a vehicle.

In the drawings, the following legend has been used:

| | |
|---|---|
| 10 | Fastener Cover |
| 12 | License Plate Frame or other attachable object |
| 14 | Vehicle or other object to receive attachment |
| 16 | Fastener |
| 18 | license plate frame fastener receptacle |
| 20 | vehicle fastener receptacle |
| 22 | Emblem |
| 24 | First Emblem Position |
| 26 | Second Emblem Position |
| 28 | Obverse of Emblem |
| 30 | Reverse of Emblem |
| 32 | Attachment Receptacle |
| 34 | Protrusion adjacent to attachment receptacle |
| 35 | Surface of emblem for contact with frame channel face |
| 36 | Screw or other attachment mechanism |
| 38 | Spring |
| 40 | Channel formed in license plate frame |
| 42 | Channel face |
| 44 | Detent means such as Indentation in channel face |
| 46 | Pivoting means |
| 48 | Fastening Tool |

| | |
|---|---|
| 50 | License Plate |
| 52 | Area of License Plate obscured by license plate frame |

DESCRIPTION OF THE PREFERRED EMBODIMENT

The present invention concerns a specialized pivoting fastener cover which may be incorporated into a license plate frame or other attachable object to be connected to a second object. In the following description, numerous specific details are set forth in order to provide a thorough understanding of the present invention. It will be obvious, however, to one skilled in the art that the present invention may be practiced without these specific details. Some well-known methods and structures have not been set forth in order not to unnecessarily obscure the description of the present invention.

In many different contexts, it is desirable to attach a first object to a second object. For example, a license plate frame may be attached to a vehicle to add a decorative feature to the vehicle surrounding the state-required license plate. In this situation and many other contexts in which one object is attached to another, it may be useful to have a cover to conceal one or more fasteners by which the two objects are attached, while still allowing the fasteners to be accessed for insertion or removal.

As best shown in FIG. 1, a first object 12, such as a license plate frame, may be attached to a second object 14, such as a vehicle. A pivoting fastener cover 10 of the present invention may be incorporated into the license plate frame 12 or added to the license plate frame 12 to decoratively conceal fasteners 16 used to attach the frame 12 to the vehicle 14.

Each pivoting fastener cover 10 includes an emblem 22 which may be easily moved between two positions 24, 26, with the cover 10 being stably connected to the license plate frame or other object 12 in each position. In the first position 24, a fastener 16 may be easily inserted, tightened, loosened, or removed in a fastener receptacle 18 of the license plate frame 12 and an adjacent fastener receptacle 20 of the vehicle 14. Thus, the fastener 16 may be inserted to connect the license plate frame 12 to the vehicle 14 or may be removed to disconnect the license plate frame 12 from the vehicle 14 without disconnecting the fastener cover 10 from the frame 12. Unlike typical fastener covers, the claimed fastener cover 10 is unlikely to be dropped and lost when accessing the fastener 16 since the cover 10 remains connected to the frame 12.

In the second position 26, the emblem 22 of the fastener cover 10 conceals the fastener 16, providing a more aesthetically pleasing result. The emblem 22 both conceals the unattractive fastener 16 and provides additional area to extend and enhance an artistic design displayed on the frame 12. The fastener cover 10 is typically connected to the license plate frame 12 prior to attaching the frame 12 to the vehicle 14 and remains connected in both positions 24, 26, minimizing the possibility of the fastener cover 10 being lost due to theft or vehicle movement or simply being dropped while accessing fastener 16.

Figure 2:
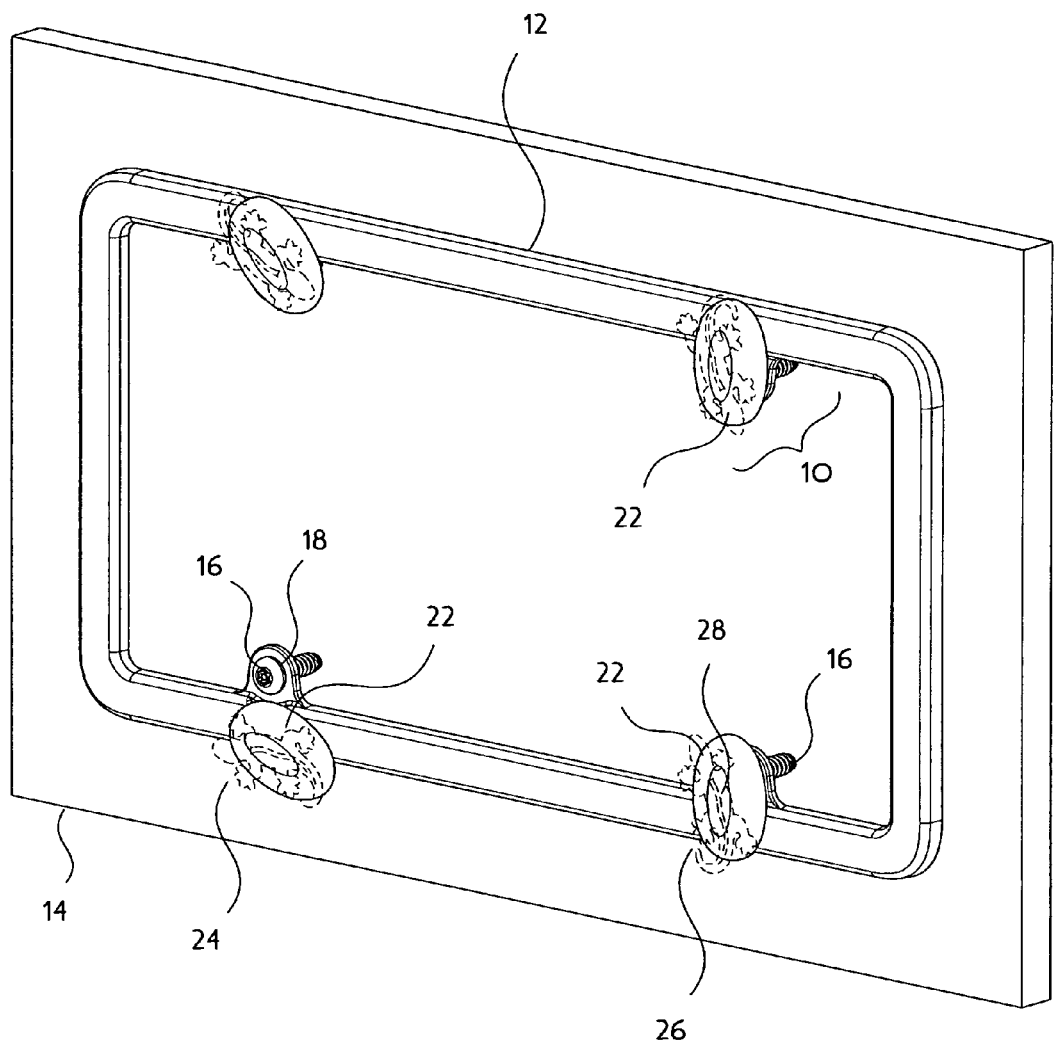
FIG. 2 is a perspective front view of the objects of FIG. 1 including a license plate frame incorporating multiple pivoting fastener covers, according to the present invention.
Figure 3:
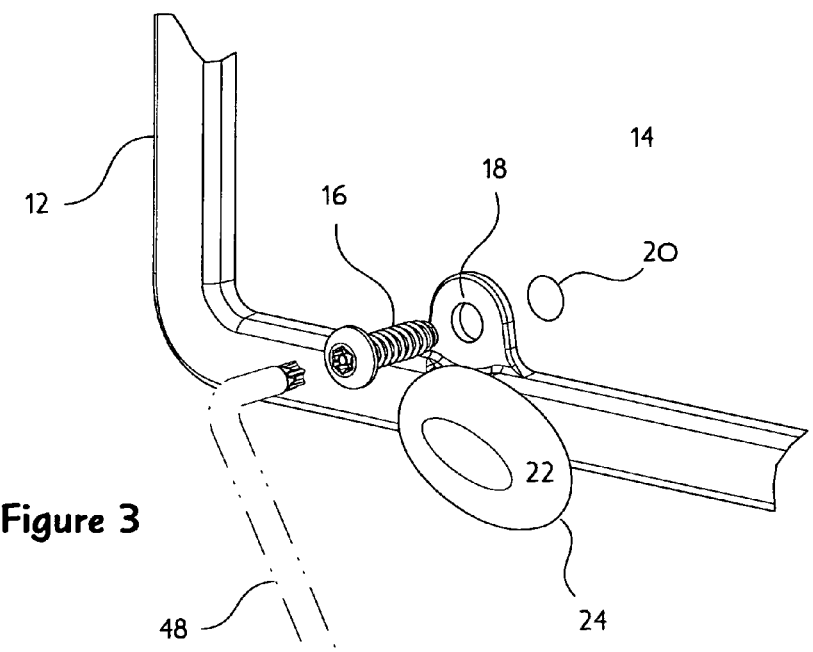
FIG. 3 is a perspective front view of a pivoting fastener cover of the present invention, pivoted to allow a fastener to be inserted in a license plate frame.
Figure 4:
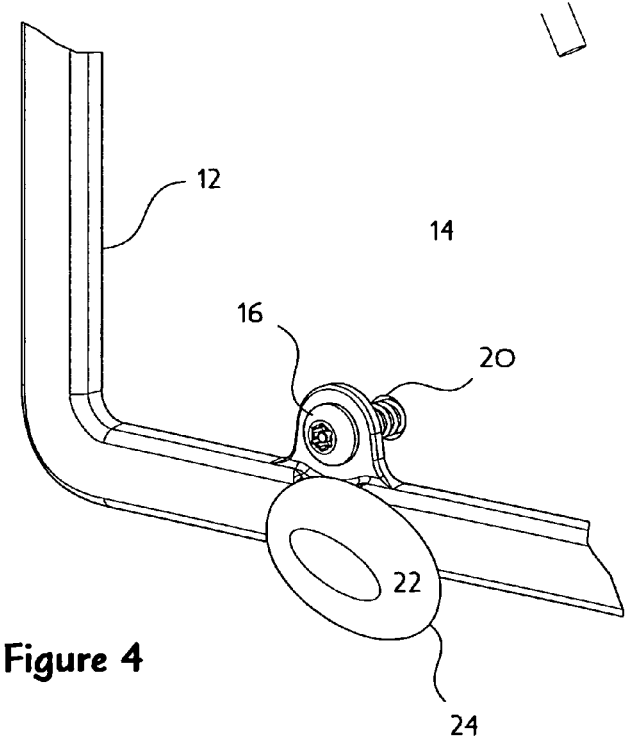
FIG. 4 is a perspective front view of a pivoting fastener cover of the present invention, pivoted to reveal a fastener already inserted in a license plate frame.
Figure 5:
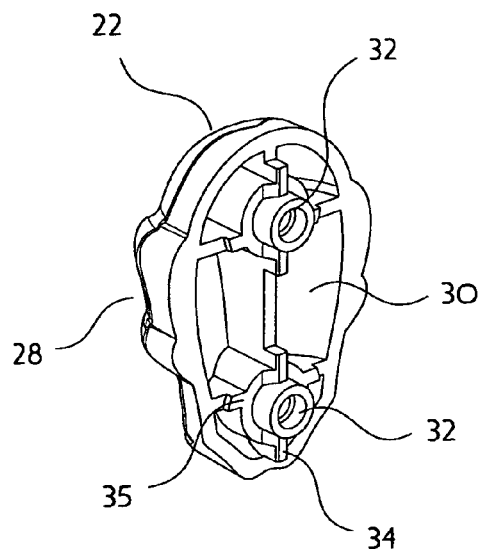
FIG. 5 is a perspective rear view of an emblem component of the pivoting fastener cover of the present invention.
Figure 7:
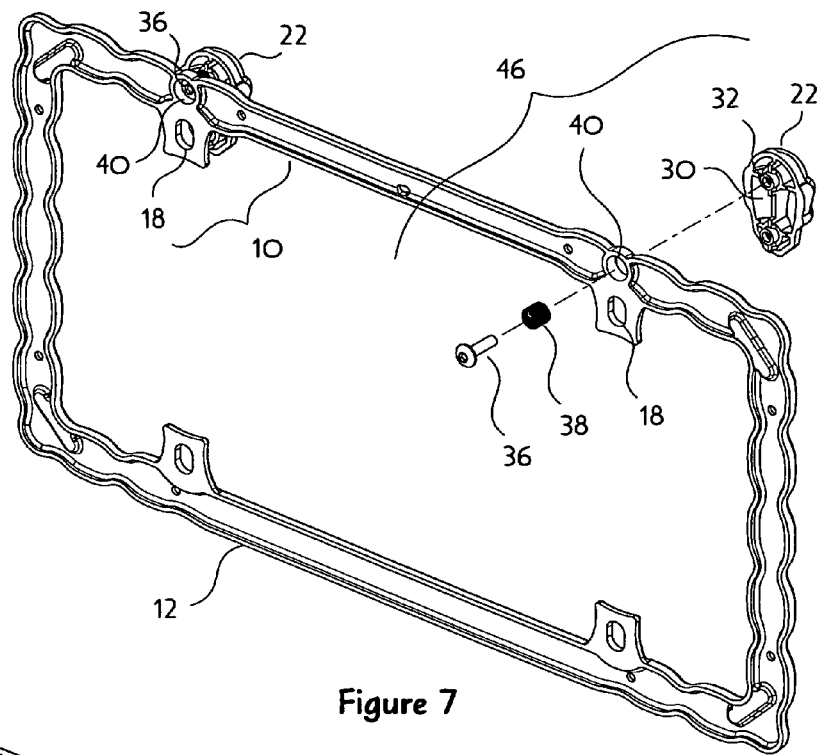
FIG. 7 is a perspective rear view of a license plate frame incorporating pivoting fastener covers of the present invention in a top position of the frame, showing a pivoting fastener cover in exploded form to illustrate components of the fastener cover.
Figure 8:
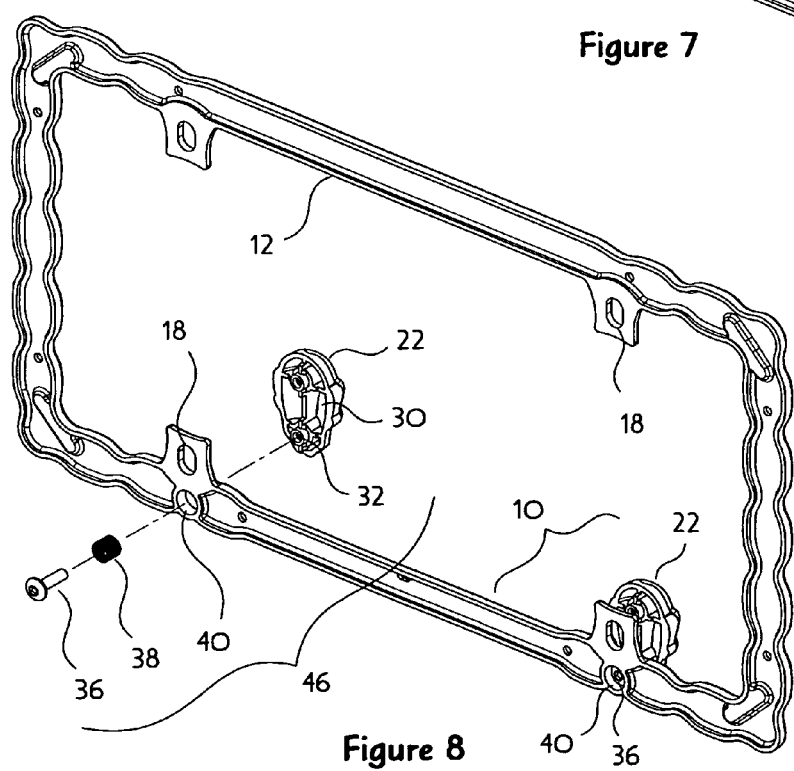
FIG. 8 is a perspective rear view of a license plate frame incorporating pivoting fastener covers of the present invention in a bottom position of the frame, showing a pivoting fastener cover in exploded form to illustrate components of the fastener cover.

The emblem 22 is ideally chosen to add a desired aesthetic effect to the frame 12. For example, the emblem 22 may be a depiction of an animal, as shown in FIGS. 1 and 2, a depiction of a face or skull, as shown in FIGS. 5, 7, and 8, a team or company logo, flowers, or any other decorative illustration. Each emblem 22 can be either a two-dimensional or three-dimensional work of art.

Figure 9:
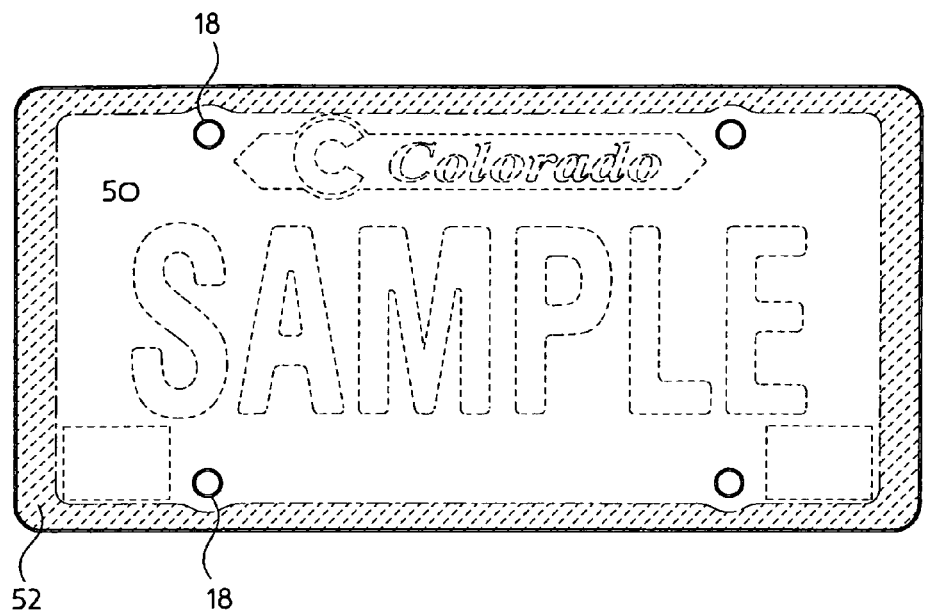
FIG. 9 is a depiction of a front of a license plate, with cross-hatching to illustrate the area of the license plate which is typically covered by a license plate frame used for artistic expression or decoration.

As best shown in FIG. 5, each emblem 22 has an obverse 28 and reverse 30. The obverse 28, being observable, is fashioned in whatever manner is most aesthetically pleasing. The reverse 30 beneficially includes one or more attachment receptacles 32 for receiving an attachment mechanism 36 for attaching the emblem 22 to the license plate frame 12, such as a screw. If multiple attachment receptacles 32 are provided, the emblem 22 can be attached in multiple positions relative to the frame 12. This flexibility may be important in contexts in which the emblem 22 may conflict with physical features of the vehicle 14 or may obscure important information. For example, when a license plate frame 12 is attached to a vehicle 14 in a manner which allows a license plate 50 to be viewed through the frame 12, as shown in FIG. 9, it may be useful to provide dual screw receptacles 32, as best shown in FIGS. 7 and 8, to allow the emblem 22 to be attached to the frame 12 in a higher or lower position on the frame 12 while maintaining a proper aesthetically pleasing orientation and still concealing the fastener 16 above or below the attachment point on the frame 12. Attaching the emblem 22 in this manner also provides flexibility so that the emblem 22 may be positioned so it does not conflict with vehicle components which are located adjacent to the frame 12 on certain vehicles 14, and while avoiding obscuring legally required information on the license plate 50.

Figure 6:
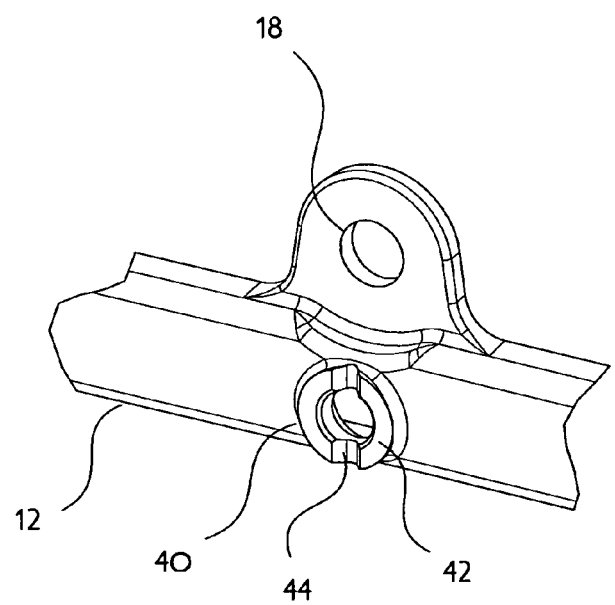
FIG. 6 is a perspective front view of a portion of a license plate frame incorporating a pivoting fastener cover of the present invention.

Detents 44 suitable for holding the emblem 22 in the first position 24 and second position 26 can be provided in various ways. In one preferred embodiment, one or more protrusions 34 are provided adjacent to each screw receptacle 32, as best shown in FIG. 5. Typically each protrusion 34 will extend radially from the screw receptacle 32. A hollow channel or boss 40 may be attached to or formed in the frame 12, as best shown in FIG. 6. The channel 40 terminates in a channel face 42 which is suitable for being placed adjacent to the reverse surface 35 of the emblem 22. In this manner, the hollow channel 40 provides a passageway through which an attachment mechanism such as a screw, brad, or pin 36 can be inserted into an attachment receptacle 32 of the emblem 22. The attachment screw 36 holds the emblem 22 against the channel face 42, as shown in FIG. 7.

The attachment mechanism 36 becomes a pivoting axis, holding the emblem 22 to the frame 12, while allowing a rotational degree of freedom for the emblem 22. Numerous pivoting mechanisms 46 may be utilized to enable the emblem 22 to be moved between the first and second positions 24, 26.

For example, a pivoting means 46 may be provided by placing a spring 38 around the screw 36 and forming at least one indentation or detent 44 in the channel face 42 to receive a protrusion 34 on the reverse side 30 of the emblem 22. An indentation 44 may advantageously be positioned in the channel face 42 to receive a protrusion 34 when the emblem 22 is in the second position 26. Reception of the protrusion 34 into the indentation 44, with the spring 38 holding the reverse surface 35 of the emblem 22 adjacent to and facing the channel face 42, allows the pivoting fastener cover 10 to be stably held in the second position 26 which best conceals the fastener 16. If desired, a second indentation 44 may beneficially be provided in a position on the channel face 42 suitable for receiving a protrusion 34 when the emblem 22 is in the first position 24, to hold the fastener cover 10 in a position which allows access to fastener 16 for insertion or removal. The first detent 44 ideally holds the emblem 22 in the most aesthetically pleasing position, instead of relying on a user to determine how best to orient the emblem 22. Unlike typical snap-on screw covers, the claimed fastener cover 10 beneficially aligns the emblem 22 in either the best position 24 for accessing the fastener 16 or the most decorative position 26, with both positions being made favorable with respect to other possible positions because of the properly positioned protrusions 34 and indentations 44.

To gain access to the fastener 16 for insertion, tightening, or removal, the pivoting emblem 22 is rotated from the second position 26 toward a first position 24. In the described preferred embodiment, as rotation begins the spring 38 compresses slightly to allow the surface 35 of emblem 22 to rise away from the channel face 42, releasing the protrusion 34 from the indentation 44 in the channel face 42. As rotation continues, the protrusion 34 moves from the indentation 44 to ride on the face 42, while the protrusion 34 is held against the face 42 by the spring 38. The axial movement from the detent is allowed by compression of the spring 38, yet the fastener cover 10 is still attached to the frame 12 by the screw 36 so it cannot fall off, be misplaced, or lost. Rotation of the emblem 22 in the opposite direction results in the opposite process to move the emblem 22 back into the second position 26 with protrusion 34 once again stably nested into indentation 44.

Additional detent positions may be included by creating more indentations 44 in the channel face 42 on the frame 12. This may permit an emblem 22 to be attached and held in more than one first position 24 or second position 26, possibly allowing the emblem 22 to be oriented right side up or upside down, providing flexibility in the way the frame 12 is mounted on the vehicle 14.

Unlike other common fastener covers, the movement of the pivoting fastener cover 10 to expose the attachment screw 16 does not require the use of tools. More typical fastener covers require tools to pry off or release the fastener cover; the misuse, slipping or lack of skill in using such tools will often damage the faster cover. The simplicity of the claimed pivoting fastener cover 10 avoids that aspect for the end consumer.

Figure 10:
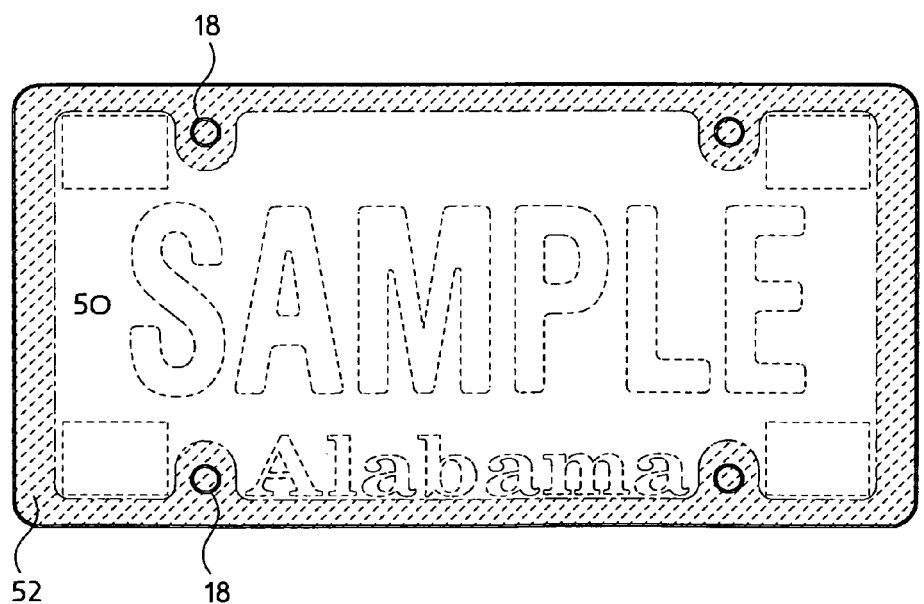
FIG. 10 is a depiction of a front of a license plate with cross hatching to illustrate the enlarged area of the license plate which is available for decoration if pivoting fastener covers of the present invention are used.

The specialized pivoting fastener cover 10 has a particularly useful result in the context of a license plate frame 12 suitable for attachment to a vehicle 14 around a state-required license plate 50, as shown by comparing FIGS. 9 and 10. Such license plate frames provide an aesthetic feature to a vehicle, when attached in a position allowing the license plate 50 to be easily viewed through the frame 12, as required by state laws. To prevent obscuring a particular portion of the license plate 50, an emblem 22 attached to such a license plate frame 12 may be pivoted to a position which conceals the fastener 16 but does not obscure particular information on the plate 50. Space for artistic design is at a premium on the frame 12, so utilizing the area normally occupied by the frame fastener receptacle 18 and the fastener 16 for artistic presentation such as a decorative emblem 22 increases the aesthetic options available in such frames. FIG. 9 illustrates, with cross hatching 52, the area typically available for artistic presentation on a license plate frame 12. In contrast, FIG. 10 illustrates, with cross hatching 52, the increased area available for decoration when the claimed pivoting fastener cover 10 is utilized, allowing the decoration to include the areas allowed for attachment screws 16. Approximately 17% more area is available for aesthetic features when the pivoting fastener cover 10 is incorporated into the frame 12. Furthermore, because the pivoting fastener cover 10 is not dependent on the fastener 16 for attachment, the emblem 22 provides the decorative features whether or not a fastener 16 is inserted in the fastener receptacle 18 covered by the emblem 22.

Although the present invention has been described in terms of the presently preferred embodiment, it is to be understood that such disclosure is purely illustrative and is not to be interpreted as limiting. For example, the pivoting means 46 may rely on a spring 38 and screw 36 as illustrated, or may be accomplished by a rivet, clip, snap, or other means. Consequently, without departing from the spirit and scope of the invention, various alterations, modifications, or alternative applications of the invention will, no doubt, be suggested by those skilled in the art after having read the preceding disclosure. Accordingly, it is intended that the following claims be interpreted as encompassing all alterations, modifications, or alternative applications as fall within the true spirit and scope of the invention.

We claim:

1. A pivoting fastener cover for concealing a fastener attaching a license plate frame to a vehicle, said license plate frame and said vehicle having fastener receptacles aligned to receive the fastener, comprising:
   a. Emblem having a size sufficient to conceal a fastener inserted in said fastener receptacles, and
   b. Pivoting attachment means for attaching said emblem to said license plate frame and for pivoting said emblem from a first position suitable for inserting a fastener in said fastener receptacles to a second position in which said emblem conceals the fastener,
   c. wherein said pivoting means enables said emblem to be moved from said first position to said second position and from said second position to said first position,
   d. wherein said emblem further comprises obverse and reverse sides, said reverse side having an attachment receptacle suitable for interfacing with said pivoting attachment means, said attachment receptacle including a first detent suitable for holding said emblem in said second position.

2. A pivoting fastener cover according to claim 1, said attachment receptacle including a second detent suitable for holding said emblem in said first position.

3. A pivoting fastener cover according to claim 1, wherein said pivoting attachment means comprises:
   a. A screw,
   b. Compressible spring surrounding said screw,
   c. A raised protrusion proximate to a screw receptacle formed in said reverse of said emblem, and
   d. Hollow channel formed in said license plate frame through which said screw can be inserted into said screw receptacle, said channel having a face suitable for placement adjacent to said reverse side of said emblem, said channel face having at least one indentation suitable for receiving said screw receptacle protrusion when said emblem is in said second position.

4. A pivoting fastener cover according to claim 3, wherein said channel face has at least one indentation suitable for receiving said screw receptacle protrusion when said emblem is in said first position.

5. A pivoting fastener cover according to claim 3, wherein said channel is positioned in proximity to said fastener receptacle so that said emblem conceals a fastener inserted in said fastener receptacle when said emblem is positioned in said second position.

6. A pivoting fastener cover for concealing a fastener attaching a license plate frame to a vehicle, said license plate frame and said vehicle having fastener receptacles aligned to receive the fastener, comprising:
   a. Emblem having a size sufficient to conceal a fastener inserted in said fastener receptacles, and
   b. Pivoting attachment means for attaching said emblem to said license plate frame and for pivoting said emblem from a first position suitable for inserting a fastener in said fastener receptacles to a second position in which said emblem conceals the fastener, c. wherein said pivoting means enables said emblem to be moved from said first position to said second position and from said second position to said first position, d. wherein said emblem further comprises obverse and reverse sides, said reverse side having a plurality of attachment receptacles suitable for interfacing with said pivoting attachment means so that said emblem is attachable to said license plate frame in a plurality of locations proximate to a fastener receptacle and said emblem may be pivoted between said first position and said second position in each of said locations.

7. A pivoting fastener cover according to claim 6, wherein each attachment receptacle includes a first detent suitable for holding said emblem in said second position.

8. A pivoting fastener cover according to claim 7, wherein each attachment receptacle includes a second detent suitable for holding said emblem in said first position.

9. A license plate frame having a pivoting fastener cover, comprising:
   a. Fastener receptacle for receiving a fastener suitable for attaching said license plate frame to a vehicle,
   b. Emblem having a size sufficient to conceal a fastener inserted in said fastener receptacle when said emblem is positioned in front of said fastener receptacle,
   c. Pivoting attachment means for attaching said emblem to said license plate frame and for pivoting said emblem from a first position suitable for inserting a fastener in said fastener receptacle to a second position in which said emblem conceals said fastener,
   d. wherein said pivoting attachment means enables said emblem to be moved from said first position to said second position and from said second position to said first position, and
   e. wherein said emblem further comprises obverse and reverse sides, said reverse side having an attachment receptacle suitable for interfacing with said pivoting attachment means, said attachment receptacle including a first detent suitable for holding said emblem in said second position.

10. A pivoting fastener cover according to claim 9, said attachment receptacle including a second detent suitable for holding said emblem in said first position.

11. A license plate frame having a pivoting fastener cover comprising:
   a. Fastener receptacle for receiving a fastener suitable for attaching said license plate frame to a vehicle,
   b. Emblem having a size sufficient to conceal a fastener inserted in said fastener receptacle when said emblem is positioned in front of said fastener receptacle,
   c. Pivoting attachment means for attaching said emblem to said license plate frame and for pivoting said emblem from a first position suitable for inserting a fastener in said fastener receptacle to a second position in which said emblem conceals said fastener,
   d. wherein said emblem further comprises obverse and reverse sides, said reverse side having a plurality of attachment receptacles suitable for interfacing with said pivoting attachment means.

12. A pivoting fastener cover according to claim 11, each attachment receptacle including a first detent suitable for holding said emblem in said second position.

13. A pivoting fastener cover according to claim 12, each attachment receptacle including a second detent suitable for holding said emblem in said first position.

14. A license plate frame having a pivoting fastener cover, comprising:
   a. Fastener receptacle for receiving a fastener suitable for attaching said license plate frame to a vehicle,
   b. Emblem having a size sufficient to conceal a fastener inserted in said fastener receptacle when said emblem is positioned in front of said fastener receptacle,
   c. Pivoting attachment means for attaching said emblem to said license plate frame and for pivoting said emblem from a distinct first position suitable for inserting a fastener in said fastener receptacle to a distinct second position in which said emblem conceals said fastener,
   d. wherein said pivoting attachment means is independent of a fastener inserted in said fastener receptacle.

\* \* \* \* \*